Aug. 27, 1929.  N. C. CHRISTENSEN  1,726,258
PROCESS OF TREATING OXIDIZED ORES OF LEAD
Filed Dec. 4, 1922
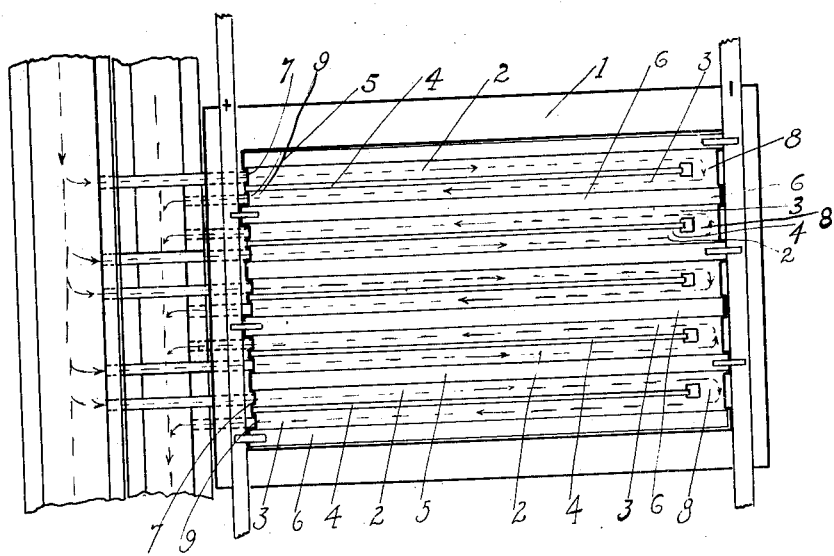
INVENTOR
Niels C. Christensen Patented Aug. 27, 1929.

1,726,258

UNITED STATES PATENT OFFICE.

NIELS C. CHRISTENSEN, OF SALT LAKE CITY, UTAH.

PROCESS OF TREATING OXIDIZED ORES OF LEAD.

Application filed December 4, 1922. Serial No. 604,933.

This invention relates to the treatment of ores containing lead carbonate or other oxidized lead minerals, for the recovery of the lead therefrom. As noted in my patent application Serial No. 327,403, a salt solution containing ferrous or ferric chloride will dissolve the lead carbonate, the action of the ferric chloride in the brine being as indicated below.

$$3PbCO_3 + 2FeCl_3 + 3H_2O = 3PbCl_2 + 2Fe(OH)_3 + 3CO_2$$

I have found that the action of the ferric chloride salt solution is much more rapid and complete than the ferrous chloride salt solution, and that the ferric chloride solution is therefore preferable in the treatment of these ores. The object of my invention is to treat these ores with a ferric chloride solution and to recover the lead therefrom in such a way as to secure the ferric chloride necessary in the process. I accomplish this in general in the following manner: The ore is treated (leached or agitated and filtered) with a concentrated salt (NaCl) solution containing ferric chloride in sufficient quantity to react with the lead mineral in the ore and dissolve the lead as a chloride. This pregnant solution is then separated from the residue of ore and the lead recovered therefrom in such a manner that an equivalent of ferric chloride is made for the treatment of more ore. This may be done in general in the two ways as described in the following:

In the first method the ore is lixiviated with a hot salt solution containing ferric chloride using such a proportion of solution to ore as to secure a relatively concentrated lead solution. This hot pregnant solution is separated from the ore and cooled sufficiently to precipitate approximately one-third or more of the lead from the solution as a chloride. This lead chloride is separated from the solution and the remaining lead is precipitated by electrolizing the solution with an iron anode, the lead being precipitated at the cathode (as a sponge lead) and ferrous chloride being generated at the anode, as indicated in the folowing chemical equations:

$$PbCl_2 = Pb + Cl_2$$
$$Fe + Cl_2 = FeCl_2$$

The precipitated lead chloride (one third of the total) is electrolized in a molten condition with a graphite electrode giving metallic lead and chlorine as indicated in the following equation:

$$PbCl_2 = Pb + Cl_2$$

The chlorine from this operation is introduced into the ferrous chloride solution formed in the previous operation changing the ferrous chloride to ferric chloride as indicated in the following chemical equation:

$$2FeCl_2 + Cl_2 = 2FeCl_3$$

thus generating the solution necessary for the treatment of more ore.

In this way the lead may be recovered and the leaching solution regenerated by the use of about one fifth of a pound of iron per pound of lead and the electric power required to electrolize two thirds of the lead in solution (at a voltage which may be as low as one half a volt in warm solutions and with a current efficiency of approximately ninety per cent) and the electric power required to electrolize one third of the lead in a molten condition.

The process may also be carried out as follows: The ore is lixiviated with a concentrated salt solution (preferably warm or hot though a cold solution may be used with good results) containing sufficient ferric chloride to dissolve the lead. This pregnant solution is separated from the residue of ore and two thirds of the lead to be precipitated is removed therefrom by electrolizing the solution with iron anodes forming ferrous chloride and lead, as described above. This solution containing the ferrous chloride and the remaining one third of the lead to be precipitated is then electrolized with insoluble anodes (preferably in a cell containing a diaphragm between the anode and cathode) the lead being precipitated at the cathode and ferric chloride formed at the anode as indicated below:

$$PbCl_2 = Pb + Cl_2$$
$$2FeCl_2 + Cl_2 = 2FeCl_3$$

The cell should preferably be arranged so that the solution containing the lead chloride and ferrous chloride flows first through the cathode compartment where the lead is precipitated and then through the anode compartment where the ferrous chloride is changed to ferric chloride by the chlorine released at the anode.

The diagram given in the figure illustrates the flow of the partly precipitated solution containing the ferrous chloride through a diaphragm cell, as just noted. In said view the electrolytic cell 1 is divided into a cathode compartment 2 and an anode compartment 3 by the diaphragm 4 which prevents mixture of the ferrous and ferric solutions but allows the passage of the electric current. The cathode 5 may be made of lead or iron and the anode 6 of graphite, and the diaphragm 4 of asbestos or other material which will resist the action of ferric chloride. The flow of solution in the cell is shown by the dotted line and arrows. The ferrous solution enters the cathode compartment at 7 and flows through it longitudinally, all the lead to be precipitated having been precipitated by the time the solution reaches the opening 8 into the anode compartment. The solution then flows longitudinally through the anode compartment, the ferrous chloride being oxidized to ferric chloride by the chlorine given off at the anode by the time the solution reaches the outlet 9. A continuous flow of solution must be maintained through the cell. There will be some diffusion of ferric chloride through the diaphragm which cuts down the efficiency of the cell in the matter of power consumption but unless an attempt is made to precipitate the lead in the solution down to a very small amount, this effect is not sufficient to greatly decrease the efficiency of the cell.

By my process a practically complete extraction of lead from oxidized ores may be secured at a relatively low cost, as it will be seen from the foregoing that only one-fifth of a pound of iron is required per pound of lead and the cost of electric power required is relatively small due to the low voltage necessary for electrolysis.

What is claimed is:—

The process of treating carbonate ores of lead and the like, for the recovery of lead therefrom, which consists in lixiviating the ore with a concentrated sodium chloride brine containing ferric chloride and thereby dissolving the lead as lead chloride, separating the pregnant solution containing lead chloride from the lixiviated ore, electrolizing said solution with an iron anode to precipitate substantially two thirds of the dissolved lead and thus forming ferrous chloride in said solution, and thereafter electrolyzing said solution with an insoluble anode to precipitate approximately one third of the lead in solution and converting the ferrous chloride in said solution, by electrolytic action, into ferric chloride by bringing said solution into contact with said insoluble anode at which anode the chlorine formed by said last electrolysis is released, and using the ferric chloride solution thus formed to lixiviate more ore.

In testimony whereof I have signed my name to the specification.

NIELS C. CHRISTENSEN.